Dec. 11, 1934.　　　W. B. SENSEMAN　　　1,984,201
PROCESS FOR CALCINING GYPSUM
Filed March 23, 1928　　　3 Sheets-Sheet 1
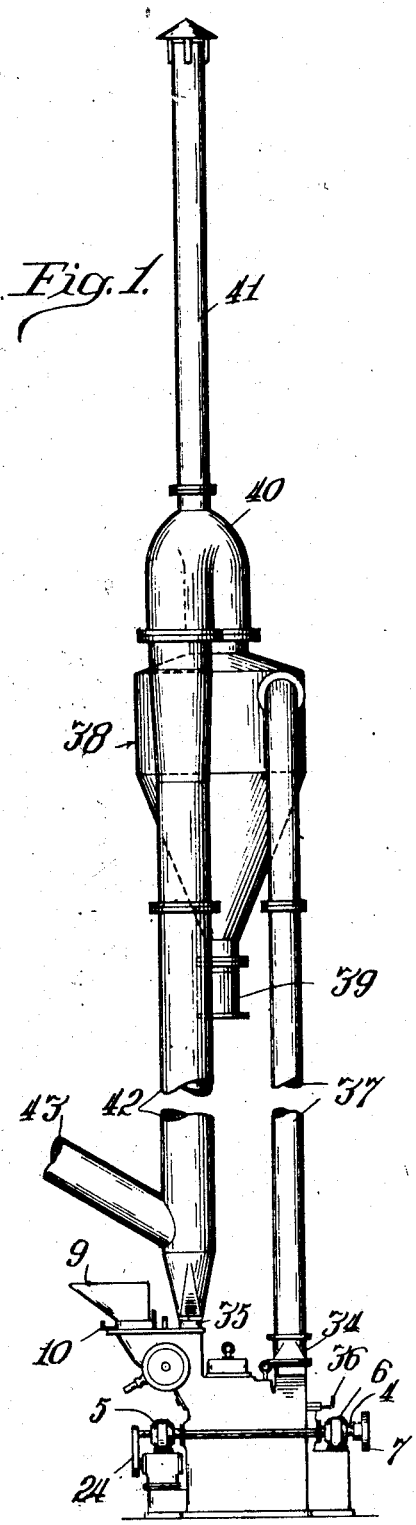
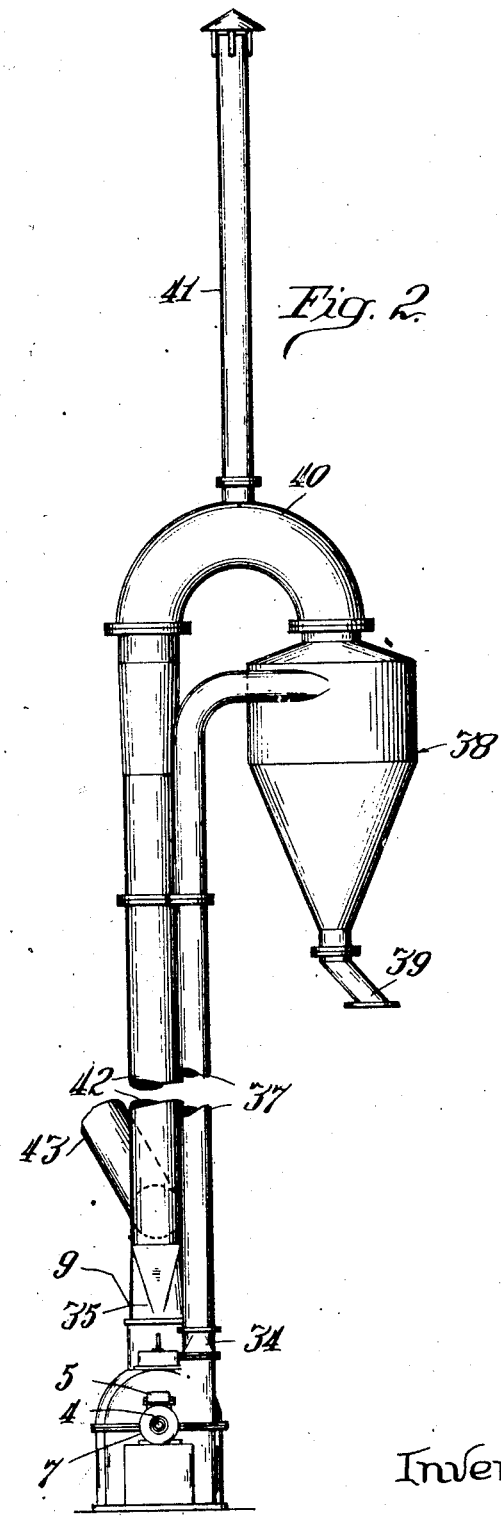
Inventor
William B. Senseman
By Barnett & Truman
Attorneys Dec. 11, 1934.  W. B. SENSEMAN  1,984,201
PROCESS FOR CALCINING GYPSUM
Filed March 23, 1928   3 Sheets-Sheet 2
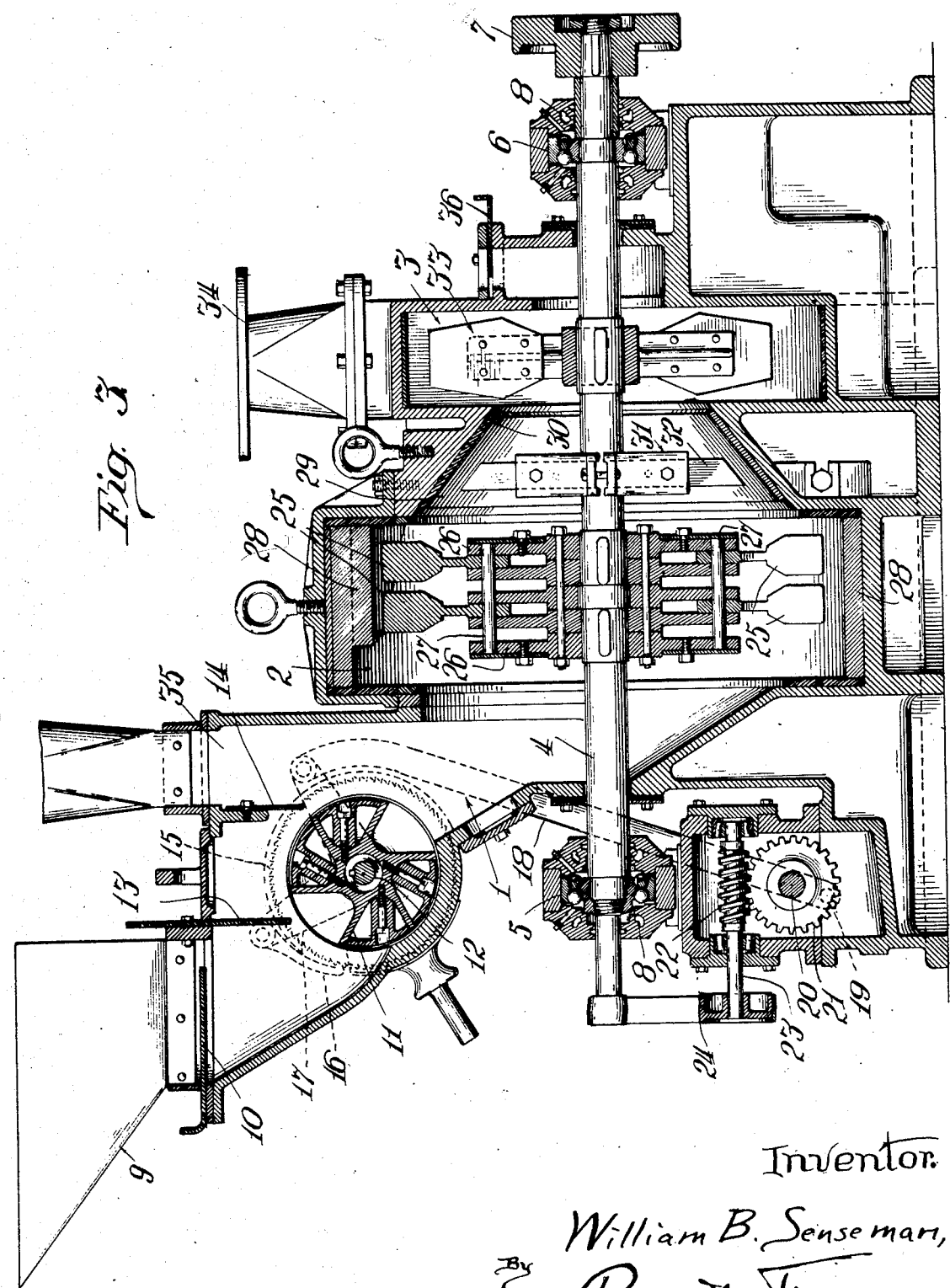
Inventor.
William B. Senseman,
By Barnett & Truman
Attorneys.

Dec. 11, 1934.　　W. B. SENSEMAN　　1,984,201
PROCESS FOR CALCINING GYPSUM
Filed March 23, 1928　　3 Sheets-Sheet 3
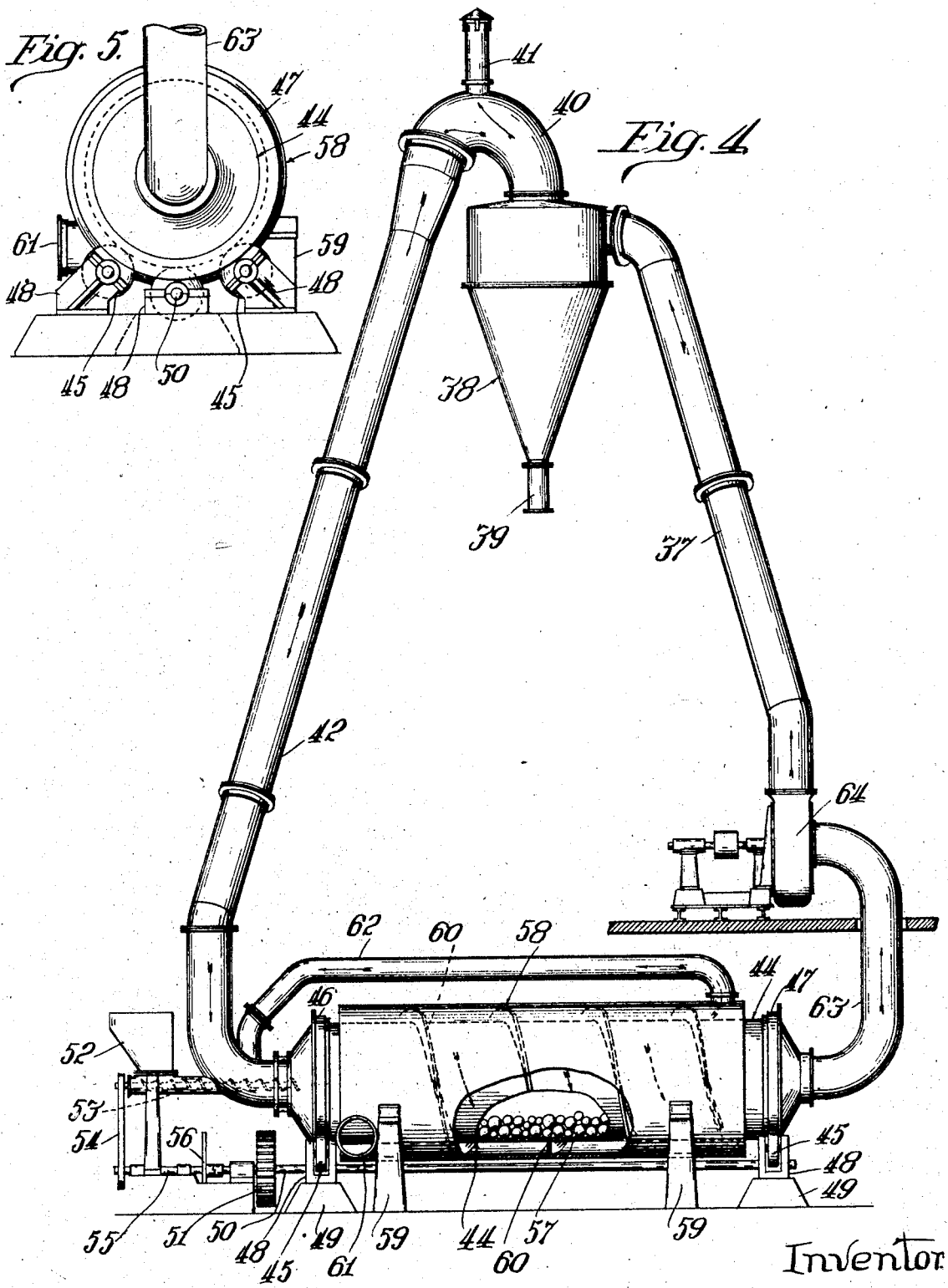

Patented Dec. 11, 1934

1,984,201

UNITED STATES PATENT OFFICE 1,984,201

PROCESS FOR CALCINING GYPSUM

William B. Senseman, Los Angeles, Calif., assignor to The Raymond Brothers Impact Pulverizer Co., Chicago, Ill., a corporation of Illinois Application March 23, 1928, Serial No. 264,182

9 Claims. (Cl. 222—6)

This invention relates particularly to a new method of calcining gypsum for the production of plaster, the process consisting, in brief, in applying heat to the mill in which the gypsum is ground so that the combined water is removed by evaporation during the grinding process.

Gypsum is a naturally occurring mineral, hydrated calcium sulphate, having the chemical formula $CaSO_4 + 2H_2O$. In the manufacture of plaster, the gypsum is calcined to remove part or all of the combined water, or water of crystallization, depending upon the grade of plaster desired. For some plasters, all of the water is removed, while for other plasters only a part of the water of crystallization is removed, giving a material of the approximate formula:

$$CaSO_4 + \tfrac{1}{2}H_2O.$$

The plaster manufacturing process now in general use is known as the "kettle" process. The gypsum is first crushed, and then fed to grinding machines, which reduce it to a relatively fine powder. The powdered material is conveyed to bins above or adjacent to the kettles. The kettles are cylindrical steel shells with steel or cast iron bottoms. The shells must be practically water-tight, and the kettles are surrounded by brick work. Heat is applied beneath and around the shell between the shell and the brick work, and there are also, as a rule, flues through the shell which carry the hot air or gas from the fire to the interior of the shell. The powdered gypsum is fed to the kettles where it is calcined for sufficient time and at a high enough temperature to produce the desired grade of plaster. The amount of dehydration will depend upon the time of treatment and the temperature used. Mechanical agitation of the plaster within the kettle is necessary in order to keep the shell from overheating, and to maintain a uniform temperature throughout the mass of plaster. The steam is exhausted to the atmosphere by means of a cover and stack on the kettle, and the products of combustion, with considerable loss of heat, are exhausted by means of another stack connected with the space between the shell and the brick-work. When the calcining process is completed, the contents of the kettles are dumped into hot pits, from which the product is carried direct to the calcined plaster bins, or is first reground and then conveyed to the calcined plaster bins.

This old kettle process has many obvious disadvantages, among which are: (1) The services of an operator in constant attendance is required to prevent overheating the material; (2) the process is not continuous and can only be operated on a batch basis; (3) the kettle bottoms frequently burn out; (4) if the mechanical agitator stops 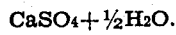 while the kettle is loaded, the quickly settling material will require that it be dug out before it can be started again; (5) brick-work maintenance is heavy; (6) it is difficult to maintain tight, yet workable gates, for discharging the calcined material from the kettle to prevent raw gypsum from leaking through into the hot pits. Raw gypsum is fatal to good plaster, since it accelerates the "set"; (7) The kettles represent a large first cost, and require considerable floor space and head room.

According to the new process disclosed in this application, the crushed gypsum is continuously introduced into a grinding mill of the air-separator type, to which heated air or hot gases are also introduced in sufficient quantities and at such temperatures as are required to effect the calcination during the grinding process. The ground and calcined material is carried from the mill in suspension in the gases, and then separated therefrom. It will be seen that in this new process, as thus briefly described, the crushed gypsum is taken from a storage bin, ground, calcined and delivered to the plaster bins in one continuous automatic, thermostatically controlled operation, in an apparatus heretofore utilized for only the grinding operation. This new system has many advantages, for example: (1) The process is continuous and largely automatic; (2) the application of heat to the mill adds but little to the first cost of the grinding mill and saves the investment in practically all of the calcining apparatus heretofore used, such as kettle bins, kettles, hot pits, conveying equipments, etc.; (3) the required housing space is greatly decreased; (4) by using an automatic regulator for feeding the material to the mill, and thermostatic controls for the temperature, a uniform calcination is obtained, and but little attention is necessary; (5) the power required for the mechanical agitator in the kettle is saved, since this work is performed by the grinding mechanism and power on the grinding mill is also saved, since as the material is calcined, or partially calcined, it becomes easier to grind; (6) there is also an appreciable saving in fuel.

The principal object of this invention is to provide a new process for calcining gypsum, or for removing combined water or water of crystallization from any solid materials or compounds, organic or inorganic, as briefly described hereinabove, and as set forth more in detail in the description which follows.

Another object is to provide certain improved forms of apparatus for carrying out this process.

Other objects and advantages of this invention will be apparent from the following detailed description of the process as carried out with an apparatus particularly adapted for this purpose.

In the accompanying drawings:

Fig. 1 is a side elevation of the principal features of one approved form of the apparatus.

Fig. 2 is an end elevation of the apparatus shown in Fig. 1.

Fig. 3 is a central vertical longitudinal section through the grinding mill, on a much larger scale than Figs. 1 and 2.

Fig. 4 is an elevation, similar to Fig. 1, showing a modified form of the apparatus.

Fig. 5 is an end view of the mill shown in Fig. 4.

Referring first more particlaly to Fig. 3, the mill here utilized by way of example is substantially of the type disclosed in the patent to Crites 1,573,040, granted Feb. 16, 1926. The mill comprises a feeding compartment 1, a beater chamber 2, and a fan chamber 3. The shaft 4, which carries the principal rotating elements of the mill extends through these chambers, and is mounted adjacent its ends, outside of the mill, in bearings 5 and 6, there being a connection 7 at one end of the shaft, by means of which it is driven from a suitable motor or other driving means. The only respect in which the mill here disclosed differs materially from similar mills heretofore used for grinding purposes only, is that bearings 5 and 6 are water cooled, as indicated at 8, to protect the bearings against the rather high temperatures to which the mill will be subjected.

The crushed gypsum, or other material, is fed into the hopper 9, provided at its bottom with a slide-valve 10, by which the size of the opening through which the material flows into the feed chamber 1, is controlled. Below the level of the hopper 9, in feeding compartment 1, is located a pocketed feed wheel 11 mounted on a shaft 12, so as to rotate in clockwise direction, as shown in Fig. 3. Adjustable plates 13 and 14 prevent material from passing from hopper 9 into the lower portion of feed compartment 1, except by rotation of the pocketed wheel 11. A ratchet wheel 15 secured at one end of shaft 12 is intermittently rotated by a pawl 16 pivoted to one arm of a bell crank 17, the other arm of this bell crank being connected by link 18 with a crank 19 on shaft 20. A worm wheel 21 secured to shaft 20 is driven by worm 22 mounted on shaft 23 which is driven by belt gearing 24 from the main driven shaft 4. Usually, this driving mechanism will be duplicated at each end of the shafts 12 and 20, the two crank pins 19 being positioned at 180 degrees from one another so that the pawls 16 will be alternately operated to impart a substantially continuous rotary motion to the pocketed feed wheel 11. Any suitable feed control means, such as disclosed in the patents to Crites, 1,523,584, granted Jan. 20, 1925, or Raymond 1,573,192 granted Feb. 16, 1926, or similar devices, might be added to the structure just briefly described for varying the speed at which the pocketed feed wheel 11 is rotated so as to change the rate of introduction of the crushed gypsum into the mill The beater element of the mill comprises a plurality of swing hammers 25, pivotally mounted on the shaft 4, by means of collars 26 and pivot pins 27. The pulverizing chamber 2 is provided with suitable liners 28, and when the mill is in operation, the hammers 25 are normally held in radial position by centrifugal force with their heads adjacent the liners 28. The material is pulverized by impact of the hammers 25, in co-operation with the liners, the material being thrown by centrifugal force against the liner members.

About the periphery of the tapering passage 29, which connects the pulverizing chamber 2 with the fan chamber 3, is positioned the conical ring 30. The regulator 31, comprising four radially disposed plates 32, is secured to the shaft 4 within the passage 29. The regulator is adjustable longitudinally of the shaft, and the plates 32 are adjustable radially so as to vary the distance between the ends of the plates and the face of the ring 30.

A fan 33 is mounted on shaft 4 within the fan chamber 3, and so arranged that upon rotation of shaft 4, in the proper operating direction, air and material carried in suspension therein will be forced out of the chamber 3 through the outlet passage 34. The hot air or combustion gas is admitted through inlet passage 35, and is drawn through the pulverizing chamber 2 and passage 29 into fan chamber 3, carrying with it the pulverized material from chamber 2. The regulator 31 serves to impede the progress of solid material from the pulverizing chamber. It keeps the gases and solid matter in rotation while in the passage 29, and throws the solid particles by centrifugal force against the ring 30, from which they are deflected back into the pulverizing chamber. Only the gases and properly pulverized material carried in suspension are permitted to pass into the fan chamber 3. If necessary, additional air may be admitted directly to fan chamber 3 through valve 36.

Referring now also to Figs. 1 and 2, the gases and solid pulverized material carried in suspension are forced upwardly through outlet 34 and pipe 37 to the cyclone separator 38, wherein the pulverized material settles out and is withdrawn through spout 39. The hot gases and steam pass upwardly through outlet passage 40, from which all, or at least a large portion of them are dissipated to the atmosphere through flue or chimney 41. A portion of the hot gases may be led back to the mill through the pipe 42 which communicates with the air inlet 35, already referred to. A pipe 43 communicates with return pipe 42 and inlet opening 35 for supplying the fresh hot air or other gases to the mill. Pipe 43 leads from any suitable furnace provided with means whereby either preheated air or combustion gases may be furnished through pipe 43 to the mill.

In the normal operation of this device, crushed gypsum will be continuously fed into the mill by the automatic feeder 11, the supply in hopper 9 being replenished at suitable intervals. Simultaneously hot air or other gases are fed into the mill through inlet 35. The reasons for returning some of the previously used gases through pipe 42 is to save some heat, and also to temper the gases supplied from the furnace through pipe 43. By providing suitable dampers or valves in the pipes 42 and 43, and also having a suitable thermostatic control of the furnace, the temperature of the gases continuously admitted to the mill may be maintained approximately at any desired temperature. It will be noted that the gypsum is entirely surrounded by and in intimate contact with these hot gases from the time it enters the mill until the pulverized gypsum is deposited in the separator 38. As the crushed material is pulverized within the chamber 2, the hot gases evaporate the combined water in the form of steam, this steam being carried along with the outflowing gaseous materials and solid materials in suspension. The de-hydration process continues throughout the time that the pulverized material is being carried through the pulverizing and fan chambers and outlet pipe 37 to the separator 38. By regulating the temperature of the hot gases supplied to the mill, and also to some extent by regulating the degree of pulverization of the gypsum, the percentage of moisture removed may be regulated.

The calcined gypsum or plaster is deposited in separator 38 and is withdrawn through spout 39. The hot gases and steam will flow out through outlet passage 40 and will, for the most part, be dissipated to the atmosphere through chimney 41, as already described.

A modified form of apparatus is illustrated in Figs. 4 and 5, utilizing a ball mill for grinding and calcining the gypsum. The hollow cylindrical drum 44 is rotatably supported in a substantially horizontal position by a plurality of wheels or rollers 45 which engage circular trackways 46 and 47 adjacent the two ends of the drum. The wheels or rollers 45 are supported in suitable brackets 48 mounted on pedestals 49, and one of the rollers 45 at each end of the drum is mounted on a drive shaft 50, which is driven from any suitable source of power through pulley or gear wheel 51. The crushed gypsum is placed in the hopper 52, from which it is conducted by the screw conveyor 53 into one end of drum 44. The screw conveyor 53 may be rotated when desired by means of the belt or chain 54 driven from shaft 55 which is connected with or disconnected from the drive shaft 50 by means of clutch 56. As is well known, a plurality of metal balls 57 are placed loosely within the drum 44, and as the drum is rotated, these balls serve to grind the solid material which has been introduced into the drum.

The greater portion of the length of drum 44 is surrounded by a hollow jacket 58, which is stationarily supported by means of the legs or struts 59. The jacket 58 is provided interiorly with a spiral rib or partition 60 so that hot gases introduced into the jacket through inlet pipe 61 adjacent one end of the drum, will be forced to follow a spiral path through the jacket, as indicated by the arrows, to the other end of the drum, after which they flow through pipe 62 back to the inlet end of the drum 44 where they are introduced into the drum along with the gases returned through pipe 42 from separator 38, and the crushed gypsum fed in by screw conveyor 53.

The ground and calcined material is withdrawn from drum 44 in suspension in the hot air or other gases through pipe 63 to the fan or exhauster 64 which also forces these materials through pipe 37 to the separator 38.

It will be apparent that the general operation is much the same as in the first described form of apparatus. However, the grinding drum and the materials therein are first heated from the outside by means of the hot gases passed around the drum through jacket 58, the gases thus partially relieved of their heat being then passed into the interior of the drum to directly contact with the gypsum and to carry the ground and calcined material away in suspension. It will be noted that the hot air or other gases are passed in the first instance around the intake end of the grinding drum, where the greatest heat is desirable.

While this process was especially designed for the manufacture of plaster from crushed gypsum, it will be apparent that it is also adaptable for the removal of combined water, or water of crystallization, from other materials, without any substantial changes in the process and apparatus as hereinabove set forth.

It should be noted that the temperature necessary to be maintained in the mill, is ordinarily, not over 350° F., and that this temperature will not injure the mill, and that no changes in the ordinary mill construction are necessary, other than the installation of the water-cooled bearings hereinabove referred to. If necessary, by appropriate changes in construction, the mill can be designed to withstand much higher temperatures.

I claim:

1. The process of removing water of crystallization or combined water from a solid material, which consists in introducing the material and hot gases into an enclosed space, grinding the material while in said space in the presence of the hot gases, removing the ground material and separating the gases and steam therefrom.

2. The process of removing water of crystallization or combined water from a solid material, which consists in introducing the material and hot gases into an enclosed space, grinding the material while in said space in the presence of the hot gases, removing the ground material in suspension in the gases, and separating the ground material from the gases and steam.

3. The process of removing water of crystallization or combined water from a solid material, which consists in introducing the material and hot gases into an enclosed space, grinding the material while in this space in the presence of the hot gases, and separating the ground material from the gases and steam.

4. The process of removing water of crystallization or combined water from a solid material, which consists in introducing the material into an enclosed space, grinding the material while in this space, removing the ground material in suspension in gases, and applying heat to the material during the grinding and conveying processes.

5. The process of calcining gypsum, consisting in introducing the crushed gypsum and hot gases into an enclosed space and grinding the material therein in the presence of the hot gases, whereby the water is removed during the grinding operation in the form of steam, and removing the ground and calcined gypsum.

6. The process of calcining gypsum, consisting in introducing the crushed gypsum and hot gases into an enclosed space, grinding the gypsum while in said space in the presence of the hot gases, removing the ground and calcined gypsum in suspension in the gases, and separating the ground material from the gases and steam.

7. The process of calcining gypsum, consisting in introducing the crushed gypsum into an enclosed space and grinding the material while in this space, removing the ground material in suspension in gases, and applying heat to the material during the grinding and conveying processes.

8. The process of calcining gypsum, consisting in introducing the crushed gypsum into an enclosed space and grinding the material while in this space, removing the ground material in suspension in gases, and applying heat to the ground material while it is being conveyed from the enclosed space.

9. The process of removing water of crystallization or combined water from a solid material, which consists in introducing the material into an enclosed space, grinding the material while in this space, passing hot gases through the space during the grinding process, and also applying heat to the associated materials within the space.

WILLIAM B. SENSEMAN.